United States Patent Office 3,343,912
Patented Sept. 26, 1967

3,343,912
RECOVERY OF ALUMINUM NITRATE FROM AQUEOUS SOLUTIONS
Wallace W. Schulz, Richland, Wash., assignor to the United States of America as represented by the United States Atomic Energy Commission
No Drawing. Filed Jan. 4, 1966, Ser. No. 518,735
8 Claims. (Cl. 23—102)

ABSTRACT OF THE DISCLOSURE

Aluminum nitrate is recovered from aqueous waste solutions resulting from the processing of irradiated nuclear fuels by extraction of the aluminum with a hydrocarbon solution of sodium di(2-ethyl-hexyl) phosphate, followed by scrubbing of the extract with nitric acid. The extraction also removes the relatively short-lived rare earth fission products, e.g. cerium 144, while the long-lived fission products cesium 137 and strontium 90 remain in the aqueous solution.

---

This invention was made in the course of or under a contract with the United States Atomic Energy Commission.

This invention relates to the extraction of aluminum from aqueous aluminum nitrate solutions by extraction with a solution of sodium di(2-ethyl-hexyl) phosphate or other alkali metal salts of di(2-ethyl-hexyl) phosphoric acid. The process is particularly adapted to the recovery of aluminum nitrate from waste solutions resulting from the processing of irradiated nuclear fuels.

In the processing of irradiated nuclear fuels, e.g. irradiated uranium metal, the fuel is dissolved in nitric acid. The uranium and plutonium are extracted by an organic solvent. In certain of these processes, e.g. the "Redox" process, aluminum nitrate is used as a salting-out agent to increase the extraction of the plutonium and uranium. In such processes, the $Al(NO_3)_3$ is eventually discarded in an aqueous waste stream and fresh salting out agent must be supplied continually. For example, in the Redox process as practiced at the Hanford Works of the U.S. Atomic Energy Commission, the $Al(NO_3)_3$ together with the other non-radioactive chemicals and various fission products is discharged as an acid waste solution known as Redox Acid Waste. This waste solution has been made alkaline and stored in underground tanks. This waste of the large quantities of aluminum nitrate employed results in a consiedrable economic loss. Moreover, the fission products, particularly strontium 90 and cesium 137, are valuable byproducts and the presence of the high concentrations of aluminum nitrate interferes with the usual processes for their recovery.

A process for the recovery of aluminum nitrate was developed at the Oak Ridge National Laboratory, which is described in U.S. Atomic Energy Report ORNL–TM–515, issued April 9, 1963, pages 4 and 5. This process (hereafter called "the Oak Ridge Process") involves the extraction of the aluminum by a solution of di(2-ethyl-hexyl) phosphoric acid (D2EHPA) in a hydrocarbon solvent and the re-extraction of the aluminum in the form of its nitrate by 5-molar nitric acid.

A disadvantage of the Oak Ridge process resides in the fact that an excessive time (10–12 hours) is required to attain equilibrium while at reasonable times of contact, e.g. five minutes, a very poor extraction is obtained.

I have found that if an alkali metal salt of a dialkyl phosphoric acid, e.g. sodium di(2-ethyl hexyl) phosphate (NaD2EHP), is substituted for the di(2-ethyl hexyl) phosphoric acid greatly improved results are obtained in that virtually complete extraction may be obtained with contact times of a few minutes.

I preferably employ a hydrocarbon solvent which is 0.5 to 1.10 molar with respect to sodium di(2-ethyl-hexyl) phosphate and 0.25 to 0.50 molar with respect to tributyl phosphate. The tributyl phosphate serves to promote solubility of the NaD2EHP in the hydrocarbon and prevent third-phase formation in contact with the aqueous solution.

The hydrocarbon solvent used is not critical. It should however be of a sufficiently low viscosity to provide good dispersion and disengaging properties, and have a fairly high boiling point, so as to avoid substantial vaporization at 60° C. in the presence of water. Paraffinic hydrocarbons of the kerosene range meet these requirements. I have found a product known as Soltrol 170 to be very suitable. Soltrol 170 is a paraffinic hydrocarbon mixture having the following characteristics: Initial boiling point, 424° F.; 10% distilled at 429° F.; 20% at 432° F.; 50% at 437° F.; 70% at 440° F.; 90% at 448° F.; 95% at 454° F.; end point 463° F.; specific gravity at 60 F., 0.7728; refractive index at 20 C., 1.4315.

In the extraction, the ratio of organic phase to aqueous phase should in general be in the range of 4:1 to 10:1. The temperature should be in the range 25° C. to 60° C.

The aluminum may be recovered from the organic solution in two ways. It may be stripped by 2 to 10 molar HNO at 60° C., recovering the aluminum as $Al(NO_3)_3$ and converting the NaD2EHP to D2EHPA. The NaD2EHP is then regenerated and any remaining aluminum is removed by contacting the organic solvent at 60° C. with NaOH. Alternatively, the first step may be omitted and all the aluminum removed as sodium aluminate. Since one of the objects of the process is to recover aluminum nitrate for reuse, the first method is preferred at present.

In addition to removing aluminum from the solution, my process separates the relatively short-lived rare earth-fission-products, particularly cerium 144, from the long-lived fission products cesium 137 and strontium 90. The rare earths are extracted along with the aluminum while the strontium and cesium remain in the aqueous phase. The cesium and strontium can be separated and recovered by known processes.

The rare earths can be separated from the aluminum by scrubbing the organic phase with 2–10 molar $HNO_3$ at a temperature of 25° C., prior to the scrubbing at 60° C. for recovery of the aluminum.

The following specific example illustrates the invention.

EXAMPLE I

This series of experiments shows the great superiority of sodium di(2-ethyl-hexyl) phosphate over di(2-ethyl-hexyl) phosphoric acid for extracting aluminum from aqueous nitrate solutions. A solution was prepared having approximately the composition of Redox acid waste.

The solution was—
  2.99 molar in $NaNO_3$,
  1.41 molar in $Al(NO_3)_3$,
  0.07 molar in $HNO_3$ and
  0.014 molar in $(NH_4)_2SO_4$.

This solution constituted the aqueous phase in all the experiments. The extractants were solutions in Soltrol 170 which were 0.5 molar in tributyl phosphate and 1.1 molar in either di(2-ethyl-hexyl) phosphoric acid (D–2EHPA) or sodium di(2-ethyl-hexyl) phosphate (NaD2EHP). This constituted the initial organic phases in the experiments, as tabulated below. The organic and aqueous phases were contacted by mechanical stirring for five mintues at 50° C., and separated by centrifugation. The aqueous phase was then analyzed for aluminum. The results are shown in Table I.

TABLE I

| Extractant Type | Aqueous Phase | | | | Organic Phase | | Percent Al Extracted |
|---|---|---|---|---|---|---|---|
| | Initial Vol., ml. | Final | | | Initial Vol., ml. | Final Vol., ml. | |
| | | Vol., ml. | pH | Al, g./l. | | | |
| D2EHPA | 5.0 | 5.0 | <0 | 36.7 | 10.0 | 10.0 | 3.5 |
| D2EHPA | 3.33 | 3.33 | <0 | 34.1 | 10.0 | 10.0 | 10.3 |
| D2EHPA | 2.50 | 2.50 | <0 | 30.6 | 10.0 | 10.0 | 19.6 |
| D2EHPA | 2.0 | 2.0 | <0 | 27.9 | 20.0 | 20.0 | 26.7 |
| NaD2EHP | 5.0 | 6.0 | 0.95 | 23.5 | 5.0 | 4.0 | 25.5 |
| NaD2EHP | 5.0 | 6.5 | 1.38 | 13.9 | 10.0 | 8.5 | 52.3 |
| NaD2EHP | 3.33 | 5.0 | 1.5 | 6.23 | 10.0 | 8.0 | 75.4 |
| NaD2EHP | 2.5 | 4.0 | 1.8 | 1.30 | 10.0 | 8.5 | 94.5 |
| NaD2EHP | 2.0 | 3.5 | 5.2 | <0.0008 | 20.0 | 18.5 | >99.9 |

A solution more closely approximating the Redox acid waste was prepared and used in Examples II to VI to investigate variables in the procedure.

EXAMPLE II

A synthetic Redox acid waste solution was used that was 2.99 M in sodium nitrate, 1.57 M in aluminum nitrate, 0.10 M in ammonium sulfate, 0.007 M in ferric sulfate, 0.006 M in chromium(III) nitrate and $10^{-5}$ to $10^{-3}$ M in each of zirconium sulfate, cerous nitrate, neodymium nitrate, cesium chloride, ruthenium chloride, strontium nitrate, ammonium molybdate, $(NH_4)_6Mo_7O_{24}$, telluric acid, $H_6TeO_6$, and sammarium nitrate, $Sm(NO_3)_3$. Two sets of extraction experiments were carried out, one using a 0.55 M solution of sodium di(2-ethyl-hexyl) phosphate and 0.25 M of tributyl phosphate in Soltrol 170 and the other set using a solution of twice the concentration, namely 1.10 M in sodium (2-ethyl-hexyl) phosphate (NaD2HP) and 0.50 M in tributyl phosphate also in Soltrol 170. Six runs were carried out with the weaker concentration and five runs with the higher concentration. The sodium (2-ethyl-hexyl) phosphate was prepared by contacting di(2-ethyl-hexyl) phosphoric acid-tributyl phosphate-Soltrol 170 solutions with a 3.7 M aqueous sodium hydroxide solution. During this contact some water was transferred into the organic phase so that the quantity of water added in the initial aqueous phase and the quantity of water after contact with the organic extractant differed. These two quantities of water are considered in the evaluation of the results of the extraction experiments.

The synthetic waste solutions were contacted with the extractant for five minutes at 60° C.; various volume ratios of aqueous:organic solutions were used. The percentage of aluminum that was not extracted into the organic solution was based on the following formula:

$$\frac{\text{Final volume aqueous} \times \text{final Al concentration}}{\text{Initial volume aqueous} \times \text{initial Al concentration}} \times 100$$

The conditions and results of these two sets of experiments are summarized in Table II.

TABLE II

| Initial NaD2EHP M | Volume Ratio Aqueous/Organic | | Final Aqueous pH | Aluminum Distribution Ratio (org./aq.) | Percent Aluminum Not Extracted |
|---|---|---|---|---|---|
| | Initial | Final | | | |
| 0.55 | 1.0 | 1.11 | 1.15 | 0.34 | 76 |
| 0.55 | 0.50 | 0.58 | 1.2 | 0.39 | 60 |
| 0.55 | 0.33 | 0.47 | 1.3 | 0.36 | 56 |
| 0.55 | 0.25 | 0.35 | 1.45 | 0.50 | 41 |
| 0.55 | 0.20 | 0.26 | 1.82 | 0.60 | 31 |
| 0.55 | 0.10 | 0.16 | 4.72 | 51.6 | 0.30 |
| 1.10 | 1.0 | 1.22 | 1.4 | 0.73 | 63 |
| 1.10 | 0.50 | 0.80 | 1.6 | 1.0 | 43 |
| 1.10 | 0.33 | 0.51 | 1.6 | 3.3 | 13 |
| 1.10 | 0.25 | 0.43 | 1.75 | 9.4 | 4.0 |
| 1.10 | 0.10 | 0.19 | 5.1 | 170 | 0.11 |

Both sets resulted in almost complete aluminum extraction into the organic solutions when the ratio of aqueous to organic was below 0.2. This illustrates the fact that the extractant should be used in at least four times the volume of the aqueous solution to be treated.

The effect of temperature and contacting time is shown in Example III.

EXAMPLE III

In this example the same synthetic waste solution was used as was used in Example II. Extraction runs were carried out both at room temperature (25° C.) and at 60° C., as is indicated in Table III. Also, in this example both the 0.55 M NaD2EHP solution and the 1.10 M NaD2EHP solution were investigated; as in Example II, the 0.55 M solution was 0.25 M in tributyl phosphate, while the 1.10 M solution contained the tributyl phosphate in a concentration of 0.50 M. Twenty-four runs were carried out at varying conditions which, together with the results, are compiled in Table III. The distribution coefficients for the aluminum are concentrations in the extract phase/concentrations in the aqueous raffinate. The volume ratio of organic extractant to aqueous feed solution was five in all experiments except in the six runs carried out with the concentrated organic extractant at 25° C., where the ratio was four.

TABLE II

| Contact Time, Minutes | Aluminum Distribution Coefficients | |
|---|---|---|
| | 0.55 M NaD2EHP | 1.10 M NaD2EHP |
| 60° C. | | |
| 3 | 0.575 | 83.5 |
| 5 | 0.600 | 78.6 |
| 10 | 0.680 | 116 |
| 30 | 0.717 | 95.6 |
| 60 | 0.683 | 56.8 |
| 120 | 0.700 | 155 |
| 25° C. | | |
| 3 | 0.510 | 4.68 |
| 5 | 0.505 | 5.42 |
| 10 | 0.563 | 4.74 |
| 30 | 0.529 | 5.72 |
| 60 | 0.580 | 5.79 |
| 120 | 0.573 | 6.91 |

A low distribution coefficient, as was obtained with the dilute solutions, would require a plurality of extraction steps to arrive at satisfactory extraction values. The table also shows that the elevated temperature yields better results than room temperature. This is particularly pronounced from the results obtained with the concentrated NaD2EHP solutions. Furthermore, it is obvious from the above data that at 60° C. a contact time of three minutes brings about already a highly satisfactory degree of extraction. The distribution ratios obtained at longer contact times at 60° C. are somewhat erratic.

EXAMPLE IV

Some of the impurities usually present in Redox waste solutions or soluitons of similar origin are coextracted into the NaD2EHP with the aluminum; for instance, iron and certain fission products, including lanthanide rare earths, yttrium and zirconium, are found to a considerable degree in the organic extract phase. In contradistinction thereto, strontium, cesium and sodium are not extracted into the extractant of this invention. Since cesium and strontium isotopes are often recovered separately for special uses, the process of this invention is excellently suitable for a preseparation of the desired isotopes from the other extractable fission products listed above. The behavior of the most frequent impurities present in Redox waste solutions is shown in Table IV. In the runs summarized in that table, portions of the synthetic waste solution used in Examples II and III were spiked with the radioisotope whose extraction was to be tested. Each solution was then contacted for five minutes at 60° C. with four volumes of 1.1 M NaD2EHP–0.5 M tributyl phosphate in Soltrol 170. The pH value of the aqueous feed solution was adjusted so that after extraction it was approximately 1.8.

TABLE IV

| Radioisotope | Distribution Coefficient (org./aq.) | Percent Extracted |
| --- | --- | --- |
| Fe-59 | 892 | >99 |
| Y-88 | 232 | >99 |
| Eu-152-154 | 66 | >99 |
| Zr-95-Nb-95 | 10 | >99 |
| Ce-144 | 6.7 | 93 |
| Cr(III)-51 | 2.3 | 81 |
| Cs-137 | 0.0012 | 0.29 |
| Sr-85 | 0.00053 | 0.12 |
| Na-22 | 0.00027 | 0.06 |

The above results clearly show the almost complete extractability of iron, yttrium, europium, zirconium, niobium, cesium and chromium, and the nonextractability of cesium, strontium and sodium.

Before the aluminum is back-extracted from the organic phase, it may be scrubbed with a dilute nitric acid at about 25° C. for the removal of coextracted fission products. By this scrubbing step, cerium and other lanthanide rare earths are stripped from the organic phase, but yttrium and zirconium remain therein.

The back-extraction of the aluminum as its nitrate can then be carried out with nitric acid. A concentration of between 2 and 10 M is suitable for this purpose. The back-extraction is best carried out at elevated temperature, as will be shown later in Example VI. An example showing generally the stripping of the aluminum from the organic NaD2EHP solution with various nitric acid concentrations is shown in Example V.

EXAMPLE V

Two sets of experiments were again carried out, one using Soltrol 0.55 M in NaD2EHP and 0.25 M in tributyl phosphate and the other one using Soltrol 1.1 M in NaD2EHP and 0.5 in tributyl phosphate for extraction from portions of aqueous waste solutions of the same composition as used in the preceding examples. The contacts for extraction were carried out at 60° C. for five minutes, whereupon the phases were separated and the organic phases were contacted with aqueous nitric acid of varying concentrations at 60° C. for 30 minutes. For the back-extractions, equal volumes of organic phase and aqueous nitric acid were used. After phase separation, the extract phase obtained in the first extraction step and the aqueous strip solution obtained in the back-extraction steps were analyzed for their aluminum contents and from the analytical results the percentage of aluminum nitrate that was retained in the organic extract phase was calculated. Table V gives the results of these tests.

TABLE V

| Initial $HNO_3$ M | 0.55 M NaD2EHP Al Not Stripped, Percent | 1.1 M NaD2EHP Al Not Stripped, Percent |
| --- | --- | --- |
| 1.0 | 47.6 | 60.2 |
| 2.0 | 5.4 | 39.3 |
| 3.0 | 3.8 | 16.5 |
| 5.0 | 1.1 | 1.7 |
| 7.0 | 0.24 | 0.89 |
| 10.2 | 1.1 | |

The above results clearly illustrate that a nitric acid concentration of between 5 and 7 M yields the most satisfactory concentrations.

The strip solution, which is a nitric acid solution of aluminum nitrate, can then be further treated, the process used therefor being dependent on the intended use of the aluminum nitrate. For instance, the solution may be subjected to the evaporation for recovery of the nitric acid and aluminum nitrate.

EXAMPLE VI

Studies were also made on the stripping of the aluminum from the organic phase with nitric acid in order to determine the most favorable temperature and contact time. For this purpose an organic feed solution was used which had been prepared by extraction of a Redox waste soltuion of the composition specified in the previous examples with four volumes of a Soltrol solution 1.1 M in NaD2EHP and 0.50 M in tributyl phosphate. These resulting organic extract phases were then contacted with an equal volume of 3 M nitric acid at 25° C. for different contact times. The results are summarized in Table VI.

TABLE VI

| Temperature, ° C. | Contact Time, Min. | Dist. Coeff., org.:aq. of $Al(NO_3)_3$ | Al Stripped, percent |
| --- | --- | --- | --- |
| 60 | 3 | 3.31 | 23 |
| 60 | 5 | 1.77 | 36 |
| 60 | 10 | 0.86 | 54 |
| 60 | 30 | 0.20 | 84 |
| 25 | 5 | 29.1 | 3.3 |
| 25 | 10 | 11.9 | 7.8 |
| 25 | 30 | 6.5 | 13 |

It is clear that elevated temperature is important to obtain a good aluminum removal from the organic phase and that a contact time of 30 minutes yields the best results.

In order to remove any residual aluminum from the organic extract phase and any fission product contaminants, such as the retained yttrium and zirconium, a contact of the organic extract phase with an aqueous sodium hydroxide solution, also at elevated temperature, is advantageous. This treatment with sodium hydroxide not only accomplishes the removal of yttrium, zirconium or the like and all residual aluminum, but it also at the same time regenerates the D2HPA to the sodium salt and thus makes it ready for reuse in the removal of aluminum nitrate.

All the extraction and back-extraction procedures can be carried out by batch or continuous countercurrent methods, as is known to those skilled in the art.

Other salts of dialkyl phosphoric acids may be employed, e.g. potassium, cesium or lithium di(2-ethyl-hexyl) phosphate.

It will be understood that the invention is not to be limited to the details given herein, but that it may be modified within the scope of the appended claims.

The embodiments of the invention in which exclusive property or privilege is claimed are defined as follows:

1. A method of recovering aluminum nitrate from an aqueous solution comprising extracting aluminum from said aqueous solution with an organic solution of an alkali metal salt of di(2-ethyl-hexyl) phosphoric acid in a solvent which is substantially immiscible with water, the volume of said organic solution substantially exceeding the volume of said aqueous solution.

2. A process as defined in claim 1 wherein said salt is the sodium salt of di(2-ethyl hexyl) phosphoric acid and said solvent comprises hydrocarbon.

3. A process as defined in claim 2 in which said organic solution consists essentially of a hydrocarbon solution which is 0.5 to 1.10 molar in sodium di(2-ethyl hexyl) phosphate and 0.25 to 0.50 molar in tributyl phosphate.

4. A process as defined in claim 3 wherein the extraction is carried out at a temperature of 25° to 60° C.

5. A process as defined in claim 1 and further comprising scrubbing the aluminum from said organic solution.

6. A process was defined in claim 5 wherein said organic solution is scrubbed at a temperature of about 60° C. with nitric acid of concentration of 2 to 10 molar.

7. A process as defined in claim 5 wherein said organic solution is scrubbed with an aqueous solution of an alkali metal hydroxide.

8. A process as defined in claim 3 in which the volume of the organic solution is at least four times that of the aqueous solution.

References Cited

UNITED STATES PATENTS

| 3,122414 | 2/1964 | Horner et al. | 23—102 |
| 3,211,521 | 10/1965 | George et al | 23—123 X |

OTHER REFERENCES

R. E. McHenry—ORNL–TM–515 "Fission Products Progress Report," October-November 1962.

OSCAR R. VERTIZ, *Primary Examiner.*

A. GREIF, *Assistant Examiner.*